Oct. 10, 1961 N. C. WILLIAMS 3,003,823
DIESEL ENGINE VACUUM PUMP
Filed Aug. 15, 1960 2 Sheets-Sheet 2
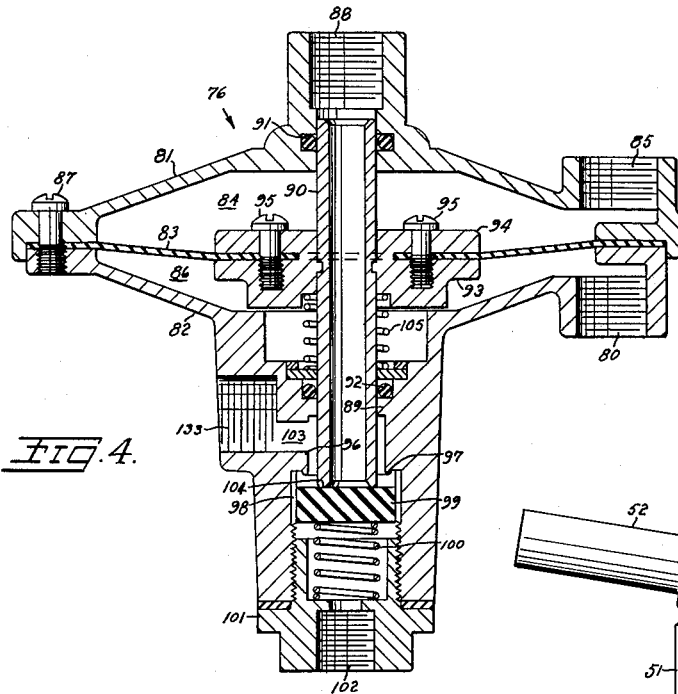
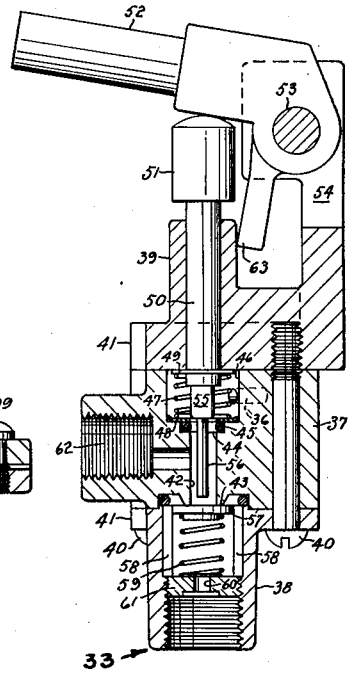
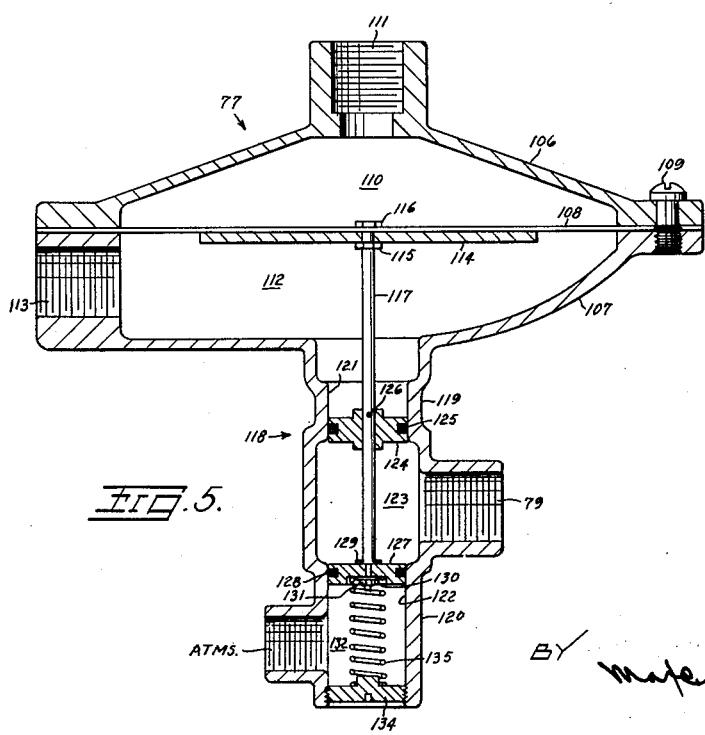
INVENTOR
Norman C. Williams
BY
AGENT United States Patent Office 3,003,823
Patented Oct. 10, 1961

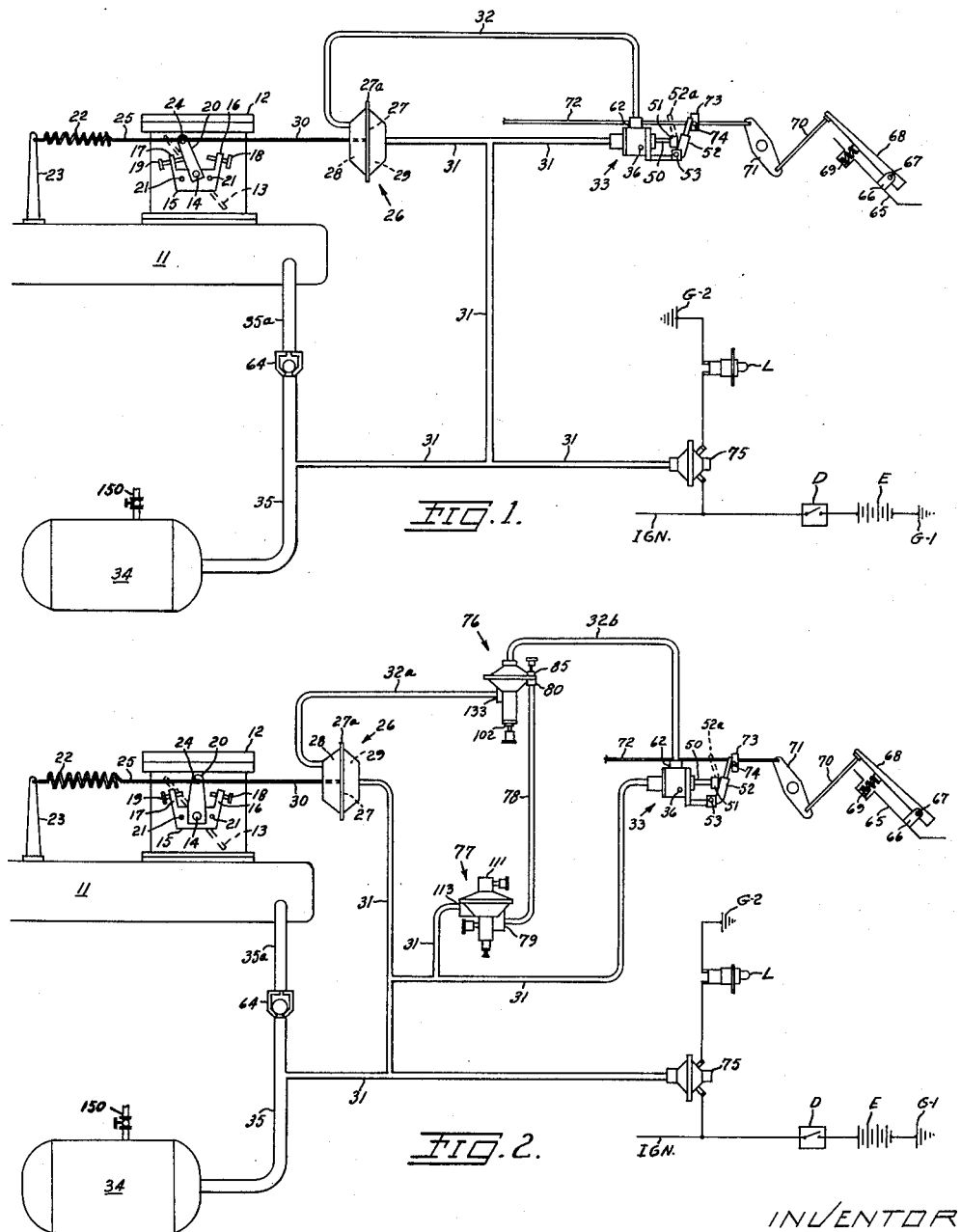

3,003,823
DIESEL ENGINE VACUUM PUMP
Norman C. Williams, Portland, Oreg., assignor to Power Brake Equipment Company, a corporation of Oregon
Filed Aug. 15, 1960, Ser. No. 49,470
6 Claims. (Cl. 303—12)

This invention relates generally to wheel brakes for automotive vehicles and more particularly to brakes in which the mechanical operation of the operating cylinders thereof is assisted by air vacuum powered booster devices.

Specifically this invention relates to means for using a diesel cycle engine to induce and accumulate air vacuum energy for use in operating the wheel brakes of an automotive vehicle driven by the diesel cycle engine.

It is well known that a diesel cycle engine, commonly called a diesel engine is a timed fuel injection engine and does not use the incoming combustion air as a carrier for its fuel supply. Usually there is no appreciable restriction for the incoming combustion air to overcome to enter the inlet manifold of the engine and therefore there is no appreciable vacuum produced in the inlet manifold of the diesel engine to be used in assisting or boosting the operation of the wheel brakes.

It is a primary object of this invention to provide means for producing such air vacuum energy in connection with the operation of a diesel engine.

It is a second object to provide means for producing such vacuum energy in connection with the operation of such an engine without interfering appreciably with the normal operation of the engine.

It is a third object to provide means for use in connection with a diesel engine for intermittently accumulating such air vacuum energy to be stored in an accumulation tank and used as required in operating the brakes of the vehicle to which the engine is applied.

It is a fourth object to provide means responsive to the pressure of air in the accumulator for activating the means for intermittently accumulating air vacuum therein.

It is a fifth object to provide additional means responsive to the pressure of air in the accumulator to preset the upper and lower air pressure limits between which the means for intermittent accumulation of air vacuum energy can operate.

How these and other objects are attained is explained in the following description referring to the attached drawing in which FIG. 1 is a schematic drawing of a simplified form in which my invention may be practiced.

FIG. 2 is a schematic drawing of a preferred form in which my invention may be practiced.

FIG. 3 is a view in side sectional elevation of a fuel throttle pedal controlled vacuum valve intermittently operable as required to cause air vacuum energy to be accumulated.

FIG. 4 is a view in side sectional elevation of an air vacuum governor valve as used to control the high and low limits of air vacuum pressure in the accumulator.

FIG. 5 is a view in side sectional elevation of an air vacuum relay valve responsive to the governor valve of FIG. 4, to modulate the capacity of the valve of FIG. 3 to increase the air vacuum energy in the accumulator.

Like reference numerals refer to like parts in the several figures of the drawing.

Referring now to FIG. 1 of the drawings, at 11 is shown the air inlet manifold of a diesel engine, not shown, used to drive an automotive vehicle, not shown. When a piston of a cylinder of the engine is on its air intake stroke air at atmospheric pressure is drawn into conduit 12 and past butterfly damper 13 into manifold 11 where it arrives as vacuum air, or air at less than atmospheric pressure, due to the resistance to its travel through conduit 12 given by damper 13.

Damper 13 as shown is secured inside conduit 12 on axle 14 supported diametrically through conduit 12 at one end on bearing bracket 15 having ears 16 and 17 with adjustable stops 18, 19, respectively to stop the movement of damper operating lever arm 20 in its respective open and closed limit positions of damper 13.

Both damper 13 and lever 20 are secured to axle 14 to rotate in either direction as a unit and screws 21 secure bearing bracket 15 to conduit 12.

Tension spring 22 anchored at one end to post 23 is secured at its other end to lever 20 at 24 by link 25 and thus biases lever 20 at all times towards stop 19.

A so-called vacuum suspended chamber 26 is formed of a hollow rigid case with its interior separated by a flexible diaphragm 27 at 27a into a first chamber 28 and a second chamber 29. Attached at one end to diaphragm 27 and slidably sealed through a wall of chamber 28 is diaphragm piston rod 30 linked at its other end to lever 20 at 24. A sufficient vacuum, or less than atmospheric pressure, in conduit 31 and chamber 29 when chamber 28 is open to atmosphere will cause diaphragm 27 to be moved by the atmospheric pressure in chamber 28 and take with it piston rod 30 to overcome the bias of spring 22 to move lever 20 to move damper 13 to its vertical or full open position.

The interior of chamber 28 is connectable through conduit 32 and valve 33 alternately to accumulator tank 34 through conduit 31, 35 and to amosphere through exhaust port 36 of valve 33.

As seen in FIG. 3, valve 33 is formed with a central body valve seat section 37 to which vacuum air valve section 38 and valve stem section 39 are secured by multiple bolts 40 through ears 41. Section 37 is formed with an axial cylindrical valve chamber 42 therethrough having an inlet valve seat 43 formed around the inlet end thereof and enlarged at the other end with an inner step 44 to support exhaust valve O-ring 45 and an enlarged space 46 for compression spring 47 strained between exhaust valve retaining disk spring 48 and snap ring 49 set circumferentially into the outer surface of valve stem 50 slidably guided axially through body section 39. The outer end of stem 50 is finished with a knob 51. Valve operating lever 52 rockable on pin 53 of bracket 54 of section 39 is operable against the bias of spring 47, first to close exhaust valve 55 into exhaust valve seat O-ring 45 and then to press operating stem 56 against inlet valve 57 slidably guided by ribs 58 on the interior of body section 38. The bias of inlet valve closing spring 59 is overcome by the pressure of stem extension 56 on inlet valve 57 to lift valve 57 from its seat 43 to open conduit 31 through inlet opening 60 in valve spring retainer 61, between ribs 58, through inlet valve, 57—43, valve chamber 42 and outlet opening 62 to conduit 32.

When operating lever 52 is released, spring 47 pushes stem end 51 to move lever 52 clockwise about pin 53 until stopped by its end 63 striking valve stem section 39 or snap ring 49 on stem 50 strikes the interior end of body part 39. As spring 47 moves stem 50 up spring 59 closes inlet valve 57—43 and then valve 55 is withdrawn from its O-ring seat 45 to open vacuum suspended chamber 28 to atmosphere through hole 36, valve seat 45, valve chamber outlet 62 and conduit 32.

Returning to FIG. 1, it is seen that between conduit sections 35a and 35 connecting tank 34 with engine manifold 11 is a one way check valve 64 through which the vacuum in tank 34 will be increased whenever there is less air pressure in manifold 11 than in tank 34.

Also secured to sloping floorboard 65 of the driver's compartment, not shown, of the vehicle to which the engine is applied, not shown, is a bracket 66 to which a fuel throttle pedal 68 is rockably pivoted at 67 and biased in the clockwise direction towards its engine idling fuel position by pedal return spring 69. Pedal 68 is linked by link 70 through direction changing linkage lever 71 to engine fuel control rod 72 to which clamp 73 holds transverse rod 74 in the path of operating lever 52 so that when the driver has released pedal 68 to its idling position lever 52 will be in its inlet valve open position shown dotted at 52a, but when additional fuel is fed to the engine by depressing pedal 68 to its position shown operating lever 52 of valve 33 will be in its position shown whereby valve 33 will close conduit 32 from line 31 and line 32 will be open to atmosphere at port 36.

Vacuum pressure monitoring switch 75 mounted on conduit 31 is connected in series between the two ground connections G1—G2 with electric source E, disconnect switch D and lamp L in the driver's cab.

The operation of the apparatus of FIG. 1 is as follows. When the vehicle is at rest with the motor shut off and tank 34 at atmospheric pressure, fuel control pedal 68 will be positioned away from floor board 65, having taken with it link 70 and lever 71 to move fuel control rod 72 to its idling or stopped position and move operating lever 52 of valve 33 to its position 52a in which the two sides 28, 29 of vacuum suspended diaphragm chamber 26 are connected to tank 34 through conduits 35, 31, 32 and valve 33. Spring 22 will hold damper lever 20 over against lever stop 19 and with it hold diaphragm piston rod 30 with diaphragm 27 to the left. Screw stop 19 will be positioned in ear 17 of damper bearing bracket 15 to position damper 13 with just sufficient wall clearance within conduit 12 so that with the normal cranking speed of the engine starting motor sufficient air will pass damper 13 to engine manifold 11 to develop an ignition temperature in the incoming air as it is compressed in the engine cylinders.

When it is desired to get the vehicle ready for operation and the engine started vacuum pressure monitoring switch 75 will be closed because the vacuum in tank 34 will be low. Disconnect switch D is first closed and electric source E will complete a circuit as shown from G1 to G2 through switches D and 75 and lamp L. The lamp L being lit indicates to the driver in his cab that he does not have sufficient air vacuum in his tank 34 to be safe to go out on the highway.

The driver will next turn on his ignition to crank his engine and he will also step on his fuel pedal 68 to start his cylinder fuel injectors and to move lever 52 of valve 33 from its idle position 52a to its running position 52 to shift the connection of chamber 28 and conduit 32 from vacuum line 31 to atmosphere port 36.

With lamp L lit and the engine being rotated by the starting motor a vacuum will build up in engine air inlet manifold 11 and through check valve 64 into vacuum conduits 31, 35 and tank 34. At the same time the compression of repeated charges of combustion air introduced into the engine cylinders will cause the temperature of the air in the cylinders to heat up to ignition temperature and the engine will overrun its starter to pick up speed and run as an engine.

In the meantime while damper 13 was being held in its partially closed position by spring 22 and the engine was being cranked by its starting motor and spring 22 was being opposed by atmospheric pressure in space 28 of chamber 26, the resistance to incoming air flow around damper 13 was building up an air vacuum in tank 34, line 31, vacuum switch 75 and space 29 of chamber 26 so that when the vacuum built up to a safe operating value in tank 34, say, 3 inches of mercury, vacuum switch 37 opened to shut off lamp L and the vacuum in space 29 of chamber 26 was sufficient to allow the atmospheric presure in space 28 to overcome spring 22 to move lever 20 with damper 13 to the wide open position of incoming air conduit 12.

When lamp L goes out the driver will remove his foot from the fuel pedal to release his fuel throttle (rod 72) to its idle position. Rod 72 then also moves operating lever 52 of valve 33 to its idle position 52a at which position chamber 28 and conduit 32 are reconnected by valve 33 from atmospheric port 36 to vacuum conduit 31, the pressures in spaces 28 and 29 of chamber 26 are equalized diaphragm 27 is suspended and spring 22 again moves damper 13 to its position of restriction of incoming conduit 12.

From the above explanation and reference to FIGS. 1 and 3 it is seen that whenever the foot throttle 68 is depressed and lamp L shows that there is a sufficient vacuum in tank 34 the engine will run as an engine without any restriction of air conduit 12 by damper 13. But if lamp L is lit showing that the stored vacuum may be too little to give safe operation of the vehicle brakes, it is only necessary for the driver to lift his foot off the throttle a few seconds to again build up the vacuum in tank 34 as indicated by the darkening of lamp L.

Having explained some of the objects of the form of my invention above described with reference to FIGS. 1 and 3 of the drawing and explained the novel and useful operation thereof, attention is called to means for improving the operation thereof. At any and all times that the fuel throttle pedal 68 and consequently lever 52 of valve 33 is in the idle position 52a, the spring 22 would have the damper 13 restricting the air intake passage through conduit 12 which could cause excessive pumping and consumption of lubricating oil and also cause too rich a fuel-air mixture for proper idling operation of the engine by possible long periods of high vacuum in intake manifold 11. The form of my invention shown in FIGS. 2, 3, 4 and 5 and now to be described avoids this excessive high vacuum condition by limiting the time during idling periods that the vacuum from line 31 through valve 33 and line 32 to space 28 in chamber 26 can neutralize the vacuum in space 29 from line 31 to suspend diaphragm 27 in chamber 26 to allow spring 22 to restrict inlet conduit 12 with damper 13. This is done, see FIG. 2, by breaking the conduit 32 of FIG. 1 and inserting between the parts 32a and 32b (see FIG. 2) of conduit 32, a vacuum relay 76 as illustrated in FIG. 4. Then a vacuum governor 77 responsive to the vacuum of tank 34 is connected by control conduit 78 from the control outlet 79 of governor 77 to the control inlet 80 of relay 76.

As seen in FIG. 4 vacuum relay 76 includes coaxial upper body part 81 and lower body part 82 together forming a chamber separated axially by a transverse flexible diaphragm 83 into an upper space 84 open to atmosphere at 85 and a control space 86 to receive conduit 78 at control inlet 80. Screws 87 hold parts 81 and 82 together with diaphragm 83 sealed therebetween. The upper wall of upper space 84 is formed with an axial inlet 88 for receiving one end of conduit 32b, the other end of which is connected to outlet 62 and valve space 42 of valve 33. Near its midlength lower body part 82 is formed with a first rigid transverse barrier 89 thereacross axially slidably to receive sealed therein by O-ring 92 hollow cylindrical valve stem 90 also slidingly sealed by O-ring 91 through the upper wall of body part 81 into inlet 88. Between spaces 84, 86 diaphragm 83 is penetrated by stem 90 and sealed thereto to move axially therewith by clamp disks 93, 94 and screws 95. Spaced below said first rigid barrier across body part 82 a second rigid barrier 96 with clearance space there-around for stem 90 is formed with concentric exhaust valve seat 97 around the under side thereof. Axially extending circumferentially spaced ribs 98 formed in body part 82 guide valve disk 99 as it is moved upwardly against its seat 97 by valve spring 100 backed up by plug 101 threaded into body part 82 and centrally open through atmospheric port 102 and ribs 98 to valve space 103 when valve disk 99 is pressed downwardly away from its seat 97 by vacuum valve seat 104 formed on the annular lower end of stem 90 when the upward bias of spring 105 on diaphragm 83 and stem 90 is overcome by the atmospheric pressure in space 84 aided by the vacuum in space 86.

As seen in FIG. 5, governor body parts 106 and 107 with diaphragm 108 sealed between them by screws like 109 form a reference pressure space 110 open to atmosphere at 111 and a control vacuum space 112 open at 113 to conduit 31 from tank 34.

Secured axially to diaphragm 108 by diaphragm disk 114, washer 115, and washer nut 116 is valve stem 117 extending through space 112 and co-axially into the co-axial hollow cylindrical downwardly extending wall 118 of body part 107. The cylindrical wall of extension 118 is inwardly restricted at 119 and 120 to form on the inside thereof spaced cylindrical vacuum valve seat 121 and cylindrical atmospheric valve seat 122 separated by valve space 123 connected by outlet 79 through wall 118 with conduit 78 and control inlet 80 into control space 86 of relay 76, vacuum valve 124 slidably sealed to its cylindrical seat 121 by O-ring 125 is secured to its stem 117 to move therewith by pin 126. Atmospheric valve 127 slidably sealed to its cylindrical seat 122 by O-ring 128 is secured to stem 117 to move therewith by washers 129, 130, and nut 131. Valves 124 and 127 are spaced along stem 117 slightly more than their seats 121, 122 are spaced whereby valve space 123 can not be open to both vacuum space 112 and atmospheric space 132 at the same time. Referring now to FIGS. 2, 4, and 5, it will be noted that when the engine is idling with fuel throttle pedal 68 released and rotated clockwise by spring 69 to rotate lever 52 of valve 33 to its idling position 52a, tank vacuum line 31 will be open through valve 33 to line 32b and if vacuum inlet 88 of relay 76 is open through valve stem 90 and vacuum valve 104, 99 to space 103 and outlet 133 then line 32a will balance the vacuum pressures on both sides of diaphragm 27 and release damper lever 20 to spring 22 to hold damper 13 against stop 19 to restrict the air flow through conduit 12 to build up the vacuum in tank 34.

However since it is desired to limit the vacuum which can be built up in manifold 11 and therefore in tank 34 to a pre-arranged value of say 5 inches of mercury it can be arranged for governor valve 77 to close relay valve 76 whenever the vacuum in line 31 reaches that value and to hold relay valve closed until the vacuum in line 31 drops materially below the selected value. To do this it is only necessary to adjust backing nut 134 of adjusting spring 135 of governor 77 so that when the vacuum in space 112 from line 31 at the selected vacuum will aid the atmospheric pressure in space 110 to move diaphragm 108 with stem 117 and vacuum valve 124 down to open valve 124, 121 to connect space 112 with space 123 and connect line 31 through governor 77 and line 78 through inlet 80 of relay 76 into control space 86 of relay 76. The vacuum from tank 34 and line 31 now connected through governor 77 into control space 86 of relay 76 will reduce the pressure in the control space 86 to aid the atmospheric pressure in the other side of diaphragm 83 in space 84 to overcome the predetermined bias of spring 105 on diaphragm 83 and valve stem 90 to move stem 90 downwardly against valve 99 to close valve 104—99 and separate conduit 32b from conduit 32a.

Further downward movement of stem 90 moves valve 99 away from its seat 97 to open valve 97—99 to connect atmospheric port 102 with space 103 and space 28 of chamber 26 through conduit 32a.

Therefore, it is seen that when the vacuum in conduit 31 has reached a predetermined high value, governor 77 responds to this predetermined vacuum limit and operates relay 76 to shift the connection of space 28 of chamber 26 from the vacuum of conduit 32b (or 31) to the atmosphere of port 102. Then the atmosphere in space 28 of chamber 26 aided by the vacuum in space 29 of chamber 26 together will move diaphragm 27 to overcome spring 22 and move damper 13 to its position of no restriction to this flow of air through conduit 12.

Note that at a predetermined high vacuum in conduit 31 diaphragm 108 in governor 77 moves down with valve 124 to connect conduit 31 through spaces 112 and 123 with conduit which dead ends in control space 86 of relay 76. Then when the vacuum in line 31 drops again diaphragm 108 in governor 77 moves up with valves 124 and 127 first to close space 123 and conduit 78 from space 112 and conduits 31 and then to open space 123 and conduit 72 to atmosphere through space 132. It is seen that in relay 76 there is no connection between conduit 78 and either conduits 32a and 32b. Conduit 78 merely relays the pressure of governor space 123 to the control space 86 of relay 76 so that when the vacuum in tank 34 is too high spring 105 will be overcome by this vacuum in space 86 and conduit 32b will be separated in relay 76 from conduit 32a and conduit 32a will be opened to atmosphere and when the vacuum in tank 34 is too low, atmospheric pressure in space 86 will allow spring 105 to raise diaphragm 83 to connect lines 82a and 82b so that the system of FIG. 2 will operate exactly like the system of FIG. 1.

In either the forms of FIG. 1 or FIG. 2, a principal purpose of my invention is to provide with a diesel engine used to propel an automotive vehicle a continuous store of vacuum air energy in tank 34 to be available as required for a useful purpose like operation of the wheel brakes of the vehicle. Outlet 150 is provided on tank 34 to supply this useful vacuum connection.

Having recited some of the objects of my invention, illustrated and described two forms in which my invention may be practiced and explained the operation of each of them, I claim:

1. A vacuum air continuous energy supply means for operation of the wheel brakes of a vehicle powered by a diesel engine, comprising a diesel engine having an intake manifold, an atmospheric air conduit leading to said manifold through which air is induced when said engine is running, a damper in said conduit, a first stop means in said conduit against which said damper can be rotated in one direction to give the greatest permissible resistance to air flow through said conduit to create the greatest permissible vacuum in said manifold when said engine is being cranked at starting, a second stop means in said conduit against which said damper can be rotated in the other direction to give the least possible resistance to air flow through said conduit, means resiliently biasing said damper toward said first stop means, a vacuum suspended diaphragm chamber separated by a flexible diaphragm into a first space and a second space, a diaphragm piston rod slidably sealed through an outer wall of said first space, said piston rod being connected within said first space to said diaphragm and without said chamber to said damper to oppose said resiliently biasing means, a vacuum air accumulator tank connected to said manifold by a first vacuum line having a check valve therein to permit air to flow only in the direction from said tank to said manifold, a second vacuum line connecting said tank with said second space of said chamber to overcome said resilient biasing means to open fully said air conduit to manifold when said vacuum in said tank exceeds a preset value, a pedal three way valve having an outlet, vacuum inlet and an atmospheric inlet, a third vacuum line connecting said second vacuum line with said vacuum inlet of said valve, a fourth line connecting said outlet of said valve with said first space of said chamber, said vehicle including a fuel throttle pedal for said engine, said pedal including a first adjustable stop means setting a minimum fuel flow to said engine in one direction of throw of said pedal for idling said engine, a second adjustable stop means setting a maximum fuel flow to said engine in the other direction of throw of said pedal for full power from said engine, said pedal including means when in its idling position to set said valve to admit vacuum from said third line to said fourth line to balance the vacuum in said second space from said second line with the vacuum in said first space from said fourth line to suspend said diaphragm in said chamber to permit said resilient means to return said damper to its restricted air flow position in said air conduit to said manifold but when said throttle pedal is in its working fuel required position to hold said valve in its position of blocking said fourth line from said third line and connecting said fourth line to said atmospheric inlet to overcome said biasing means and open said damper to its full open position to stop the build up of vacuum in said tank, said tank including a vacuum signaling means sensible to the driver of the vehicle whereby when the signal indicates that the brake operating vacuum in the tank is too low the driver will take his foot from the fuel throttle pedal until the signal indicates the brake operating vacuum in the tank is again built up to a safe value.

2. The vacuum air continuous energy supply means of claim 1 including governor and relay means for limiting to within a preset range the vacuum permitted to be built up in said tank, said governor including means responsive to a preset higher vacuum in said tank to connect said tank to a control space in said relay through a control line dead-ended in said control space and responsive to a preset lower vacuum in said tank to connect said control space in said relay through said dead-ended line with the atmosphere at said governor, said relay including a second three way valve means inserted in said fourth line, said three way valve in said relay including an outlet through a first part of said fourth line to said first space in said chamber, an inlet through a second part of said fourth line from said outlet of said pedal three way valve, an atmospheric inlet and means responsive to the vacuum in said control space in said relay to operate said second three way valve when the high tank vacuum is connected to said control space therein to block the inlet from the outlet of the second three way valve and connect its atmospheric inlet to its outlet and the first space of said chamber to overcome said biasing means for said damper and move said damper to its position of unrestricted air flow to said manifold, and when the low tank vacuum causes the control space in said relay to be connected to the atmosphere at said governor to connect the inlet to the outlet of said second three way valve at said relay to connect the first and second parts of said fourth line to remove any interference by the governor and the relay from the operation of the system.

3. A vacuum air continuous energy supply means for operation of the wheel brakes of a vehicle powered by a diesel engine comprising a diesel engine having an intake manifold, an atmospheric air conduit leading to said manifold through which combustion air is induced to said engine when said engine is running, a damper in said conduit, a first stop means for said damper for limiting the movement of said damper in one direction to a preset position of restriction of airflow through said conduit to create a desired vacuum in said manifold when said engine is being cranked at starting, a second stop means for said damper for limiting the movement of said damper in the other direction to its position of least restriction of air flow through said conduit, a first resilient means biasing said damper towards said first stop means, a fuel throttle pedal operable in one direction to feed combustible fuel to the engine as a function of the movement of said pedal, a second resilient means biasing said pedal towards movement in its other less fuel feed direction, stop means for limiting the movement of said pedal in its said other direction to a desired position of idling engine fuel feed, a vacuum air accumulator tank connected to said manifold by a first vacuum line having a check valve therein to permit air to flow from said tank toward said manifold, said tank including an air inlet connected with its vacuum operated load, said load including means responsive at a preset value of the vacuum in said tank to overcome the bias of said first resilient means to move said damper to its least restricting position and said pedal including means responsive to its idling position to render said means responsive to the vacuum in said tank ineffective to overcome the bias of said first resilient means.

4. The vacuum air continuous energy supply means of claim 3 including means responsive to a higher range of values of vacuum in said tank to render said first resilient biasing means ineffective to hold said damper in its vacuum producing position.

5. A diesel engine in operating condition including a fuel throttle pedal operable between an engine idling position and a full power position, a combustion air throttle means operable between a first position of no restriction of combustion air entering the inlet manifold of said engine and a second position of restriction of said air inlet to said manifold to generate a vacuum in said manifold when said engine is idling, a vacuum accumulator tank connected to said manifold through a check valve passing air only from said tank to said manifold, a vacuum line connecting said tank with a vacuum load, resilient means biasing said air throttle towards its position of restriction of said air inlet, a first vacuum means responsive to a preset low vacuum in said tank to overcome the bias of said resilient means, a second vacuum means responsive to said fuel throttle pedal at its idling position to render said first vacuum means ineffective to overcome the bias of said resilient means.

6. The diesel engine of claim 5 including a third vacuum means responsive to a preset higher vacuum in said tank to override said second vacuum means and said fuel throttle pedal to permit said first vacuum means to overcome the bias of said resilient means to prevent the build up of a greater vacuum in said tank.

References Cited in the file of this patent
UNITED STATES PATENTS

| | | |
|---|---|---|
| 2,949,732 | Schroeder | Aug. 23, 1960 |
| 2,967,392 | Stelzer | Jan. 10, 1961 |